(No Model.) 2 Sheets—Sheet 1.
EDWARD BEESLEY, Sr., ELLIS BEESLEY, Jr. &
EDWARD BEESLEY, Jr.
MACHINE FOR CUTTING FUR FROM PELTS.
No. 495,470. Patented Apr. 18, 1893.
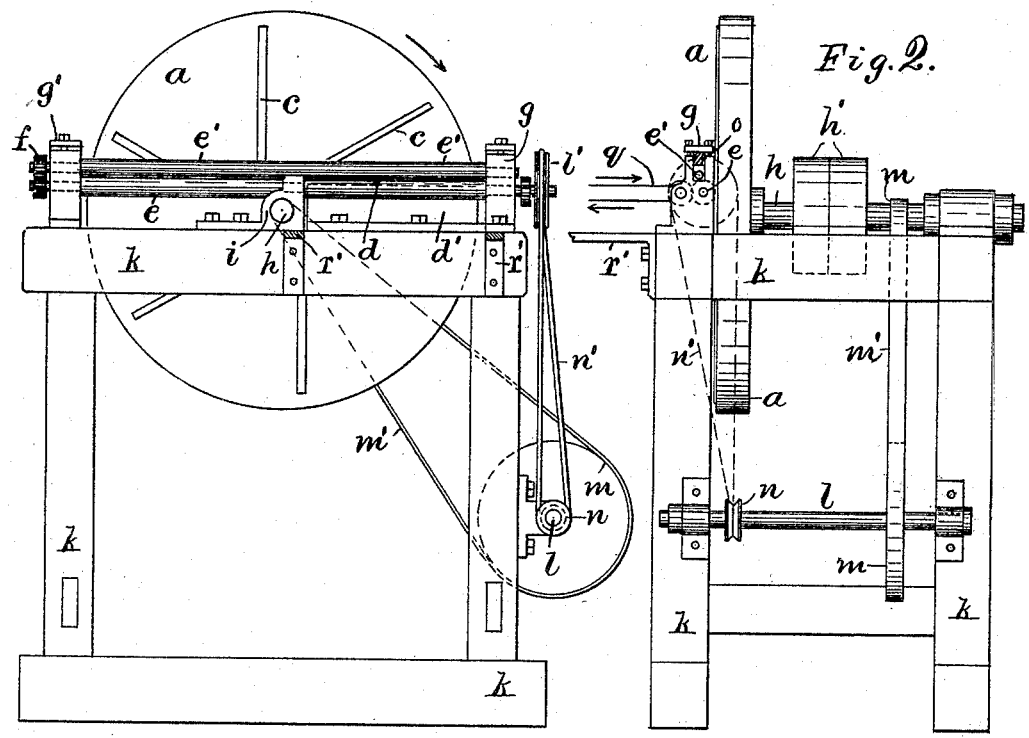
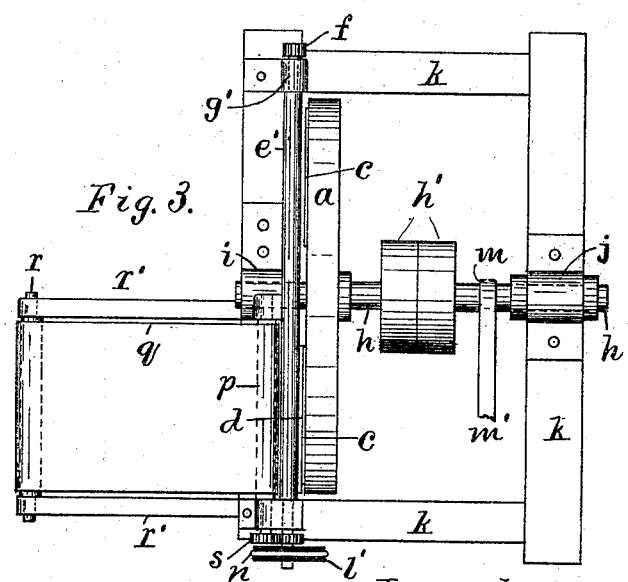
Attest:
L. Lee
E. F. Kinsey
Inventors.
Edward Beesley, Sr., Edward Beesley, Jr.,
Ellis Beesley, Jr. per Crane & Miller, Attys.

(No Model.) 2 Sheets—Sheet 2.
EDWARD BEESLEY, Sr., ELLIS BEESLEY, Jr. &
EDWARD BEESLEY, Jr.
MACHINE FOR CUTTING FUR FROM PELTS.
No. 495,470. Patented Apr. 18, 1893.
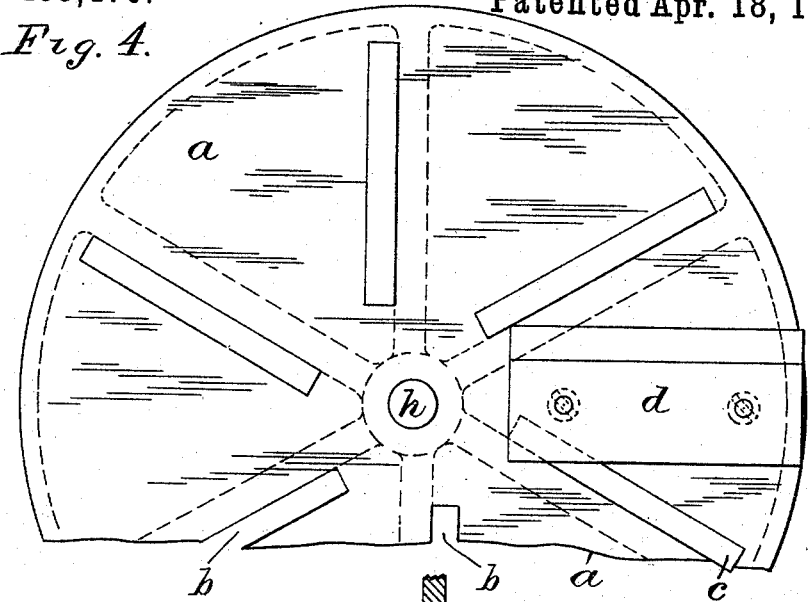
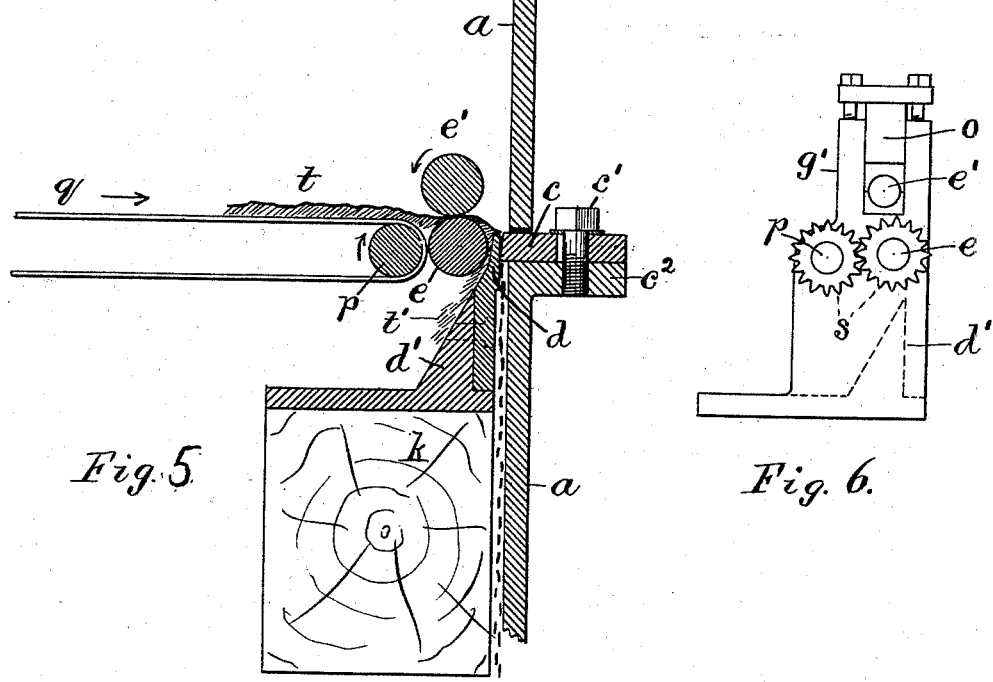
Attest:
L. Lee
E. F. Kinsey
Inventors.
Edward Beesley, Sr., Edward Beesley, Jr. and
Ellis Beesley, Jr.; per Crane & Miller, Attys.

UNITED STATES PATENT OFFICE.

EDWARD BEESLEY, SR., ELLIS BEESLEY, JR., AND EDWARD BEESLEY, JR., OF NEWARK, NEW JERSEY, ASSIGNORS TO THOMAS STONE AND GEORGE M. STONE.

MACHINE FOR CUTTING FUR FROM PELTS.

SPECIFICATION forming part of Letters Patent No. 495,470, dated April 18, 1893.

Application filed November 19, 1891. Serial No. 412,444. (No model.)

*To all whom it may concern:*

Be it known that we, EDWARD BEESLEY, Sr., ELLIS BEESLEY, Jr., and EDWARD BEESLEY, Jr., all citizens of the United States, residing at Newark, Essex county, New Jersey, have invented certain new and useful Improvements in Machines for Cutting Fur from Pelts, fully described and represented in the following specification and the accompanying drawings, forming a part of the same.

The present invention relates to that class of machines designed for cutting the fur from pelts, for use in felting operations; the skin being cut into narrow shreds to clip it from the roots of the fur. In our construction a cutting disk with cutters projected from slots in its surface is rotated within a supporting frame, the opposite ends of the disk spindle being supported in bearings upon the frame to sustain the cutting disk firmly, by which it may be rotated at a high velocity.

The invention consists partly in the particular arrangement of the stationary knife and the rotating cutters to operate upon one another with a draw cut, and partly, in the means for feeding the pelt to the cutters.

The invention will be understood by reference to the annexed drawings, in which—

Figure 1 is a front elevation of the apparatus with the feeding apron and a part of the supporting brackets removed. Fig. 2 is a side elevation with part of the apron and the brackets removed, and one of the feeding belts shown in dotted lines. Fig. 3 is a plan, including the feeding apron, but having the feed countershaft and part of one of its belts omitted. Fig. 4 is a front elevation of part of the cutter disk, with the stationary knife. Fig. 5 is a section of the feed rolls, the stationary knife and its support, and a part of the feeding apron; one of the cutters being shown moved partly downward over the face of the knife and Fig. 6 is an elevation of the housing for the feed roll bearings.

$a$ is the cutting disk and $h$ is the spindle of the same having its ends mounted in bearings $i$ and $j$, upon the opposite sides of a rectangular frame work $k$. The cutting disk is hung within the frame adjacent to the side beam which supports the bearing $i$, and slots inclined to the radius of the disk are formed in the disk, as shown in Figs. 1 and 4, with cutters $c$ secured therein.

$d$ is an upright stationary knife secured upon a bed $d'$, with its edge projected considerably above the top of the spindle $h$, as shown in Fig. 4.

$e$ and $e'$ are feed rolls extended across the face of the disk over the top of the spindle $h$, and connected at one end by gears $f$. The feed rolls are supported in housings $g$, $g'$, upon the top of the frame $k$ adjacent to the edges of the disk.

The stationary knife consists in a flat blade having its flat face set parallel with the plane of the disk and interposed between the lower feed roll and the path of the edges of the cutters $c$.

Fast and loose pulleys $h'$ are fitted to the spindle to drive the same, and a countershaft $l$ is mounted upon the lower part of the frame beneath a pulley $l'$ upon the lower feed roll. The countershaft is driven from the spindle $h$ by pulleys $m$ and belt $m'$, and a pulley $n$ and belt $n'$ connect the countershaft with the pulley $l'$. Rubber springs $o$ are inserted in the housings to press the feed rolls together, and an apron roll $p$ is fitted to the housing $g$ and to the bearing $i$ to sustain the inner end of an apron $q$, the outer end of which is carried by a roll $r$ supported by brackets $r'$. Gears $s$ connect the roll $p$ with the roll $e$.

The upper edge of the stationary knife $d$ is adjusted a little below the contact of the feed rolls, as shown in Fig. 3, so as to deliver the pelt from between the rolls a little above the top of the knife. The cutters $c$ are inserted in the disk in an inclined position, and thus operate upon the inner corner of the knife blade first, the remainder of the cutter making a draw cut over the edge of the knife. With this construction we have found that the cutters operate to sharpen themselves continuously, and that the cutting action of the machine, when run at high speed, is maintained in great perfection. A pelt $t$ is shown upon the apron with the fur downward, and extended through the rolls with its edge resting upon the knife $d$; and the fur $t'$, clipped therefrom, passed downward between the roll $e$ and the knife. The shreds of the pelt would pass between the disk and the knife. The projection of the cutters from the face of the disk, as shown in Fig. 5, permits the edge of the pelt to spring up very slightly after each cut, so that the next cutter will press the edge of the skin (advanced by the feed rolls) against the edge of the knife, and remove a portion of the skin with very little of the fur.

The machine may be operated upon any class of fur bearing pelts. Smaller scraps of skin which have been left over from the operation or other fur cutting machines, may be placed upon the apron and fed automatically into the rolls, and the fur successfully removed therefrom.

The cutters are shown secured by bolts $c'$ to flanges $c^2$ formed at right angles with the back of the disk; but the cutters may be secured in the slots by any other suitable means.

Having thus set forth the nature of our invention, what is claimed herein is—

1. In a machine for cutting fur from pelts, the combination, with the frame $k$, of the bearings $i$ and $j$, the spindle $h$ provided with pulleys $h'$ and with the disk $a$ hung within the frame, the disk being provided with the slots $b$ and cutters $c$ arranged as set forth, feed rolls above the level of the spindle $h$, the knife $d$ supported between the feed rolls and the disk, with the upper edge of the knife and the contact of the feed rolls being wholly above the top of the spindle $h$ to secure a draw cut between the knife and the cutters, an apron sustained adjacent to the feed rolls and means for rotating the cutter disk, the feed rolls and the apron, substantially as set forth.

2. In a machine for cutting fur from pelts, the combination, with the frame $k$, of the bearings $i$ and $j$ upon opposite sides of the frame, the spindle $h$ provided with the disk $a$ hung within the frame, the disk being provided with the slots $b$ and cutters $c$ arranged as set forth, feed rolls above the level of the spindle $h$, the knife $d$ supported between the feed rolls and the disk, the upper edge of the knife and the contact of the feed rolls being wholly above the top of the spindle $h$ to secure a draw cut between the knife and the cutters, the countershaft $l$ and belts and pulleys for connecting the spindle, the countershaft and the feed rolls, substantially as herein set forth.

In testimony whereof we have hereunto set our hands in the presence of two subscribing witnesses.

EDWARD BEESLEY, SR.
    ELLIS BEESLEY, JR.
    EDWARD BEESLEY, JR.

Witnesses:
 T. P. VANDERHOLF.
 THOS. S. CRANE.